United States Patent
Hironaka

Patent Number: 5,546,400
Date of Patent: Aug. 13, 1996

[54] DEMAND ASSIGN COMMUNICATION CONTROL SYSTEM

[75] Inventor: Ken Hironaka, Tokyo, Japan

[73] Assignee: NEC Corporation, Tokyo, Japan

[21] Appl. No.: 497,892

[22] Filed: Jul. 3, 1995

[30] Foreign Application Priority Data

Jul. 6, 1994 [JP] Japan .................................. 6-154385

[51] Int. Cl.$^6$ ........................................ H04J 3/16
[52] U.S. Cl. ........................................ 370/95.1; 370/110.1
[58] Field of Search ................................ 370/95.1, 110.1, 370/112, 85.7, 95.2, 95.3, 112, 58.1, 58.2, 58.3

[56] References Cited

U.S. PATENT DOCUMENTS

| | | | |
|---|---|---|---|
| 4,566,094 | 1/1986 | Ardon et al. | 370/58 |
| 4,937,818 | 7/1990 | Sonetaka | 370/95.3 |
| 5,446,732 | 8/1995 | Miyamoto | 370/58.2 |
| 5,463,645 | 10/1995 | Nagashima | 371/67.1 |
| 5,467,344 | 11/1995 | Solomon et al. | 370/58.3 |
| 5,504,737 | 4/1996 | Ichii et al. | 370/17 |

Primary Examiner—Douglas W. Olms
Assistant Examiner—Kwang Yao
Attorney, Agent, or Firm—Whitham, Curtis, Whitham & McGinn

[57] ABSTRACT

A first and a second communication controllers are connected to each other via a communication line, and each covering a plurality of terminals and assigning vacant channel in response to a communication demand for communication of the terminals. The first communication controller sets in advance attribute information necessary for communication of each of the plurality of terminals, makes the channel assignment according to the attribute information, generates ECC of the channel assignment information, and transmits the ECC to the second communication controller. The second communication controller sets in advance attribute information necessary for communication of each of the plurality of terminals, makes the channel assignment according to the attribute information, generates ECC of the channel assignment information, compares own ECC and the received ECC of the first communication controller and transmits the comparison result to the first communication controller.

12 Claims, 4 Drawing Sheets

| TS1 | TS2 | TS3 | TS4 | TS5 | TS6 | TS7 | TS8 |
|-----|-----|-----|-----|-----|--------|-----|---------|
| A | B | B | B | A | VACANT | C | CONTROL |

(FRAME)

| TERMINAL | NUMBER OF TS REQUIRED | MULTIPLEXING RULES |
|---|---|---|
| A | 2 | 4TS INTERVAL |
| B | 3 | CONTINUOUS |
| C | 1 | ARBITRARY |
| D | 1 | ARBITRARY |
| E | 2 | ARBITRARY |
| CONTROL INFORMATION | 1 | FINAL TS |

| TS NO. | USAGE STATE |
|---|---|
| 1 | A |
| 2 | B |
| 3 | B |
| 4 | B |
| 5 | A |
| 6 | VACANT |
| 7 | C |
| 8 | CONTROL INFORMATION |

DEMAND ASSIGN COMMUNICATION CONTROL SYSTEM

BACKGROUND OF THE INVENTION

The present invention relates to a demand assign communication control system and, more particularly, to a demand assign communication control system, in which communication channel assignment is set (in response to and) only in response to communication demands.

In this type of demand assigned communication control system in the prior art, a central communication controller, in response to receipt of a communication demand, assigns a vacant channel of the communication line to the central communication controller to which the opposite terminal of communication is connected, and in order to match the channel assignment information between the two central communication controllers it transmits all newly assigned channel information (i.e., communication terminal address information, newly assigned channel No. information, etc.) to the other central communication controller by making use of a control channel.

In such a prior art demand assigned communication control system, the channel setting time between the central communication controllers is greatly dependent on the transmission speed of the control channel since a control channel is used to transmit all newly assigned channel information. In other words, when the control channel transmission speed is set to be low for efficient communication, considerable time is required until it is ready to commence the communication between terminals, which is undesired for efficient and smooth data communication itself.

SUMMARY OF THE INVENTION

An object of the invention is therefore to provide a demand assigned communication control system, capable of transmission efficiency improvement without increasing the control channel transmission speed.

According to one aspect of the present invention, there is provided a demand assigned communication control system comprising a first and a second communication controllers connected to each other via a communication line, and each covering a plurality of terminals and assigning vacant channel in response to a communication demand for communication of the terminals, wherein: the first communication controller includes means for setting in advance attribute information necessary for communication of each of the plurality of terminals, means for making the channel assignment according to the attribute information, means for generating ECC of the channel assignment information, and means for transmitting the ECC to the second communication controller; and the second communication controller includes means for setting in advance attribute information necessary for communication of each of the plurality of terminals, means for making the channel assignment according to the attribute information, means for generating ECC of the channel assignment information, and means for comparing own ECC and the received ECC of the first communication controller and transmitting the comparison result to the first communication controller.

According to another aspect of the present invention, there is provided a demand assigned communication control system comprising steps of: transmitting from one of central communication controllers each covering at least one terminal, in response to receipt of a communication demand from the terminal, the demand to an opposite central communication controller, and making a channel assignment; generating ECC of the channel assignment information and transmitting the ECC to the opposite central communication controller by the one central communication controller; receiving the ECC, comparing the received ECC with ECC of the channel assignment information generated in the opposite central communication controller, and transmitting the comparison result to the one central communication controller; and setting the channel assignment setting in both the central communication controllers if the comparison result shows the coincident.

According to other aspect of the present invention, there is provided a demand assigned communication control system having two TDMs (time division multiplex systems) each serving as central communication controllers, covering a plurality of terminals, connected to each other via a communication line, and comprising: a terminal communication controller serving as an interface for communication with the terminals; a TDM communication controller serving as an interface for communication with an opposite TDM in the opposite station; a communication demand detector for detecting a communication demand from any of the terminals; a channel assignment controller for making a channel assignment with respect to the communication demand if the communication demand detector detects the communication demand; an ECC controller for generating and comparing ECC of the channel assignment information transmitted from the opposite TDM and its own ECC, and reports the comparison result to the channel assignment controller and to the opposite TDM; wherein the opposite TDM receives the communication demand from the terminal and transmits this received demand to the opposite TDM, and if the result of the ECC comparison shows the coincident, the channel assignment controller makes the channel assignment setting.

According to further aspect of the present invention, there is provided a demand assigned communication control system comprising steps of: detecting any communication demand from any terminal covered by one TDM (time division multiplex systems) and transmitting the detected communication demand from the one TDM to an other TDM as the opposite station via the control channel; making channel assignment of vacant channel in the one TDM; calculating ECC of the channel assignment information and transmitting the calculated ECC through the TDM communication controller to the other TDM; making channel assignment of a vacant channel and calculating ECC of a channel assignment information in the other TDM; comparing own generated ECC and the received ECC, in response to receipt of the channel assignment information ECC from the one TDM in the other TDM; and making the channel assignment when the comparison result shows coincident in either of the TDM.

Other objects and features will be clarified from the following description with reference to attached drawings.

DETAILED DESCRIPTION OF THE EMBODIMENTS

In an embodiment of the present invention, one of the two central communication controllers, in response to receipt of a communication demand from a terminal, transmits this demand to the other central communication controller, and also makes the channel assignment. Likewise, the other or opposite central communication controller makes the channel assignment in response to the reception of the communication demand. The one central communication controller generates ECC (error check code) of the channel assignment information and transmits only this ECC to the opposite central communication controller. The opposite central communication controller receives the ECC and compares it with ECC of the channel assignment information generated therein, and transmits only the result of comparison to the one central communication controller.

If the comparison result shows the coincident, the channel assignment setting is made in both the central communication controllers. Otherwise, it is not made. This means that it is enough to transmit only the ECC through the control channel. Thus, there is no need of increasing the transmission speed of the control channel, thus reducing the channel control time.

Figure 1A:
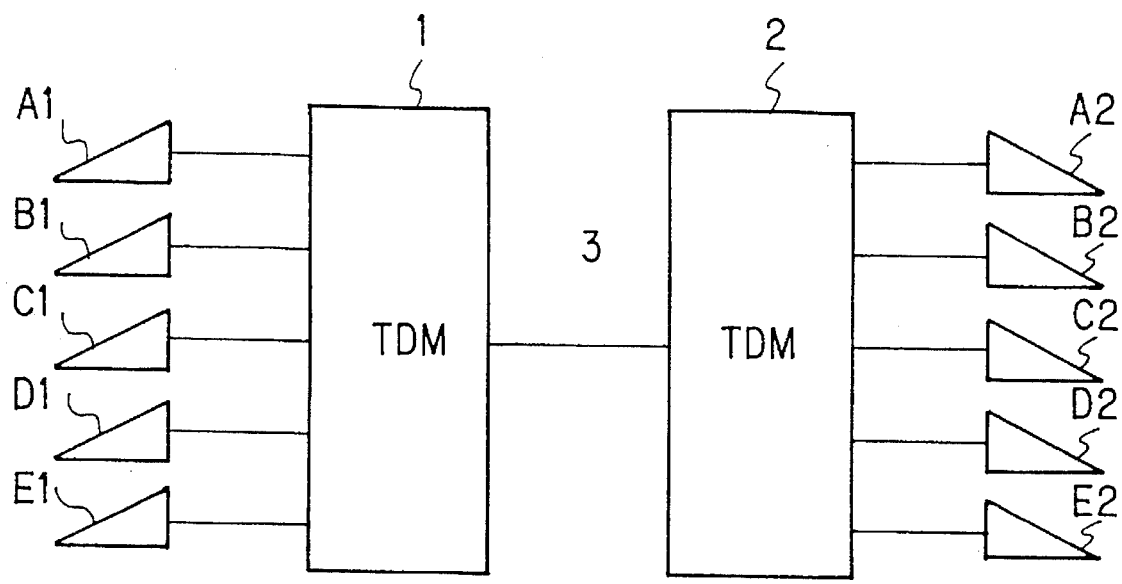
FIGS. 1A and 1B shows a block diagram of an embodiment of the demand assigned communication control system according to the present invention and a frame format of the transmission channel.
Figure 1B:
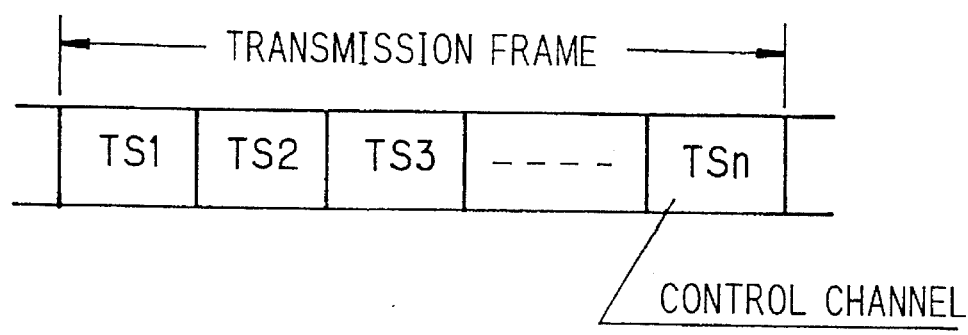

Now, an embodiment of the present invention will be described with reference to the drawings. FIG. 1A is a block diagram of an embodiment of the demand assigned communication control system according to the present invention. FIG. 1B shows a frame format of the transmission channel. Two TDMs (time division multiplex systems) 1 and 2 serve as central communication controllers are in an opposing disposition and connected to each other via a communication line 3. The TDM 1 covers a plurality of terminals A1 to E1, and the TDM 2 also covers a plurality of terminals A2 to E2.

Among these terminals, the ones A1 and A2, the ones B1 and B2, the ones C1 and C2, the ones D1 and D2, and the ones E1 and E2, make communication with each other via the communication line 3 in a time division multiplexed fashion, that is, in respective time slots TS1 to TSn of one transmission frame as shown in FIG. 1B. The time slot TSn (final time slot in the frame) is used as the control channel and the other time slots TS1 to TSn-1 are used as data channels.

Figure 2:
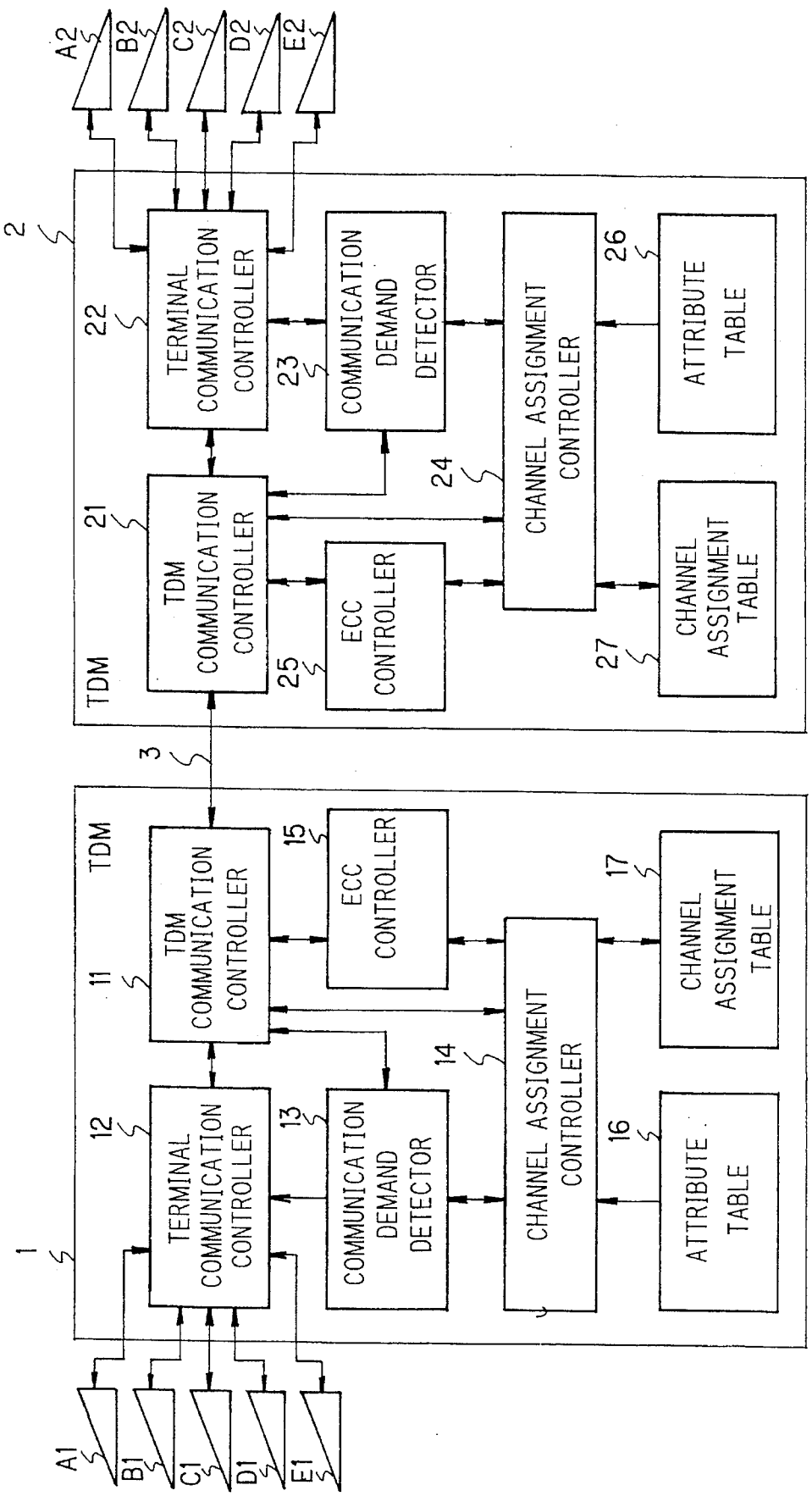
FIG. 2 shows a block diagram showing the detailed structure of the TDMs 1 and 2 shown in FIG. 1A.

FIG. 2 is a block diagram showing the detailed structure of the TDMs 1 and 2 shown in FIG. 1 in the embodiment of the present invention. The TDMs 1 and 2 have the same structure, so only the TDM 1 will be described.

In the TDM 1, a terminal communication controller 12 serves as an interface for communication with the terminals A1 to E1 that are covered by the TDM. A TDM communication controller 11 serves as an interface for communication with the TDM 2 in the opposite station.

When a communication demand detector 13 detects a communication demand from any of the terminals A1 to E1, it starts a channel assignment controller 14. The channel assignment controller 14 makes channel assignment with respect to the communication demand with reference to an attribute table 16 and a channel assignment table 17. An ECC controller 15 generates ECC of the channel assignment information. Channel assignment controllers 14 and 24 operate on the basis of the same algorithm concerning the channel assignment.

When the TDM communication controller 11 receives a communication demand from a terminal and transmits this received demand to the opposite TDM 2 via the control channel of the communication line 3.

The ECC controller 15 compares the ECC of channel assignment information which has been transmitted from the opposite TDM 2 via the control channel and its own ECC, and reports the results of comparison to the channel assignment controller 14 and also to the opposite TDM 2 via the TDM communication controller 11 by using the control channel.

If the result of the ECC comparison shows the coincident, the channel assignment controller 14 makes the channel assignment setting with respect to the channel assignment table 17, thus completing the channel assignment process. If the result of the ECC comparison shows no coincident, no channel assignment setting is made.

A specific example of attribute tables 16 and 26 and channel assignment tables 17 and 27 will be described with reference to FIG. 3. When communication is made between the terminals A1 and A2, B1 and B2, C1 and C2, D1 and D2 and E1 and E2, it is time division multiplexed communication between the TDMs 1 and 2 is made. As shown in FIG. 3(a), it is assumed that in one transmission frame the time slots TS1 and TS5 are used for communication A between the terminals A1 and A2, the time slots TS2 to TS4 are used for communication B between the terminals B1 and B2, the time slot TS7 is used for communication between the terminals C1 and C2, and the time slot TS8 is used for communication of control information between the TDMs 1 and 2.

Figures 3A, 3B, 3C:
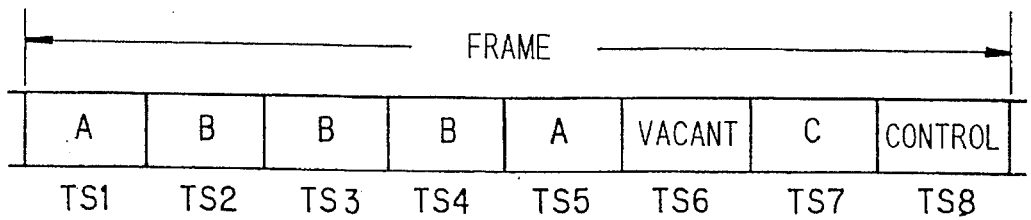
FIG. 3A–3C shows specific examples of a transmission frame, an attribute table and a channel assignment table in FIG. 2.

In this case, the contents of the channel assignment tables 17 and 27 are as shown in FIG. 3(c). The contents of setting in the attribute tables 16 and 26 are as shown in FIG. 3(b). The attributes necessary for the channel assignment are the numbers of time slots necessary for the communication of the terminals A to E and multiplexing rules (such as whether the multiplexing is continuous or as desired, time slot interval number, etc.). Likewise, for the communication of control information, necessary attributes are predetermined and set in table.

Figure 4:
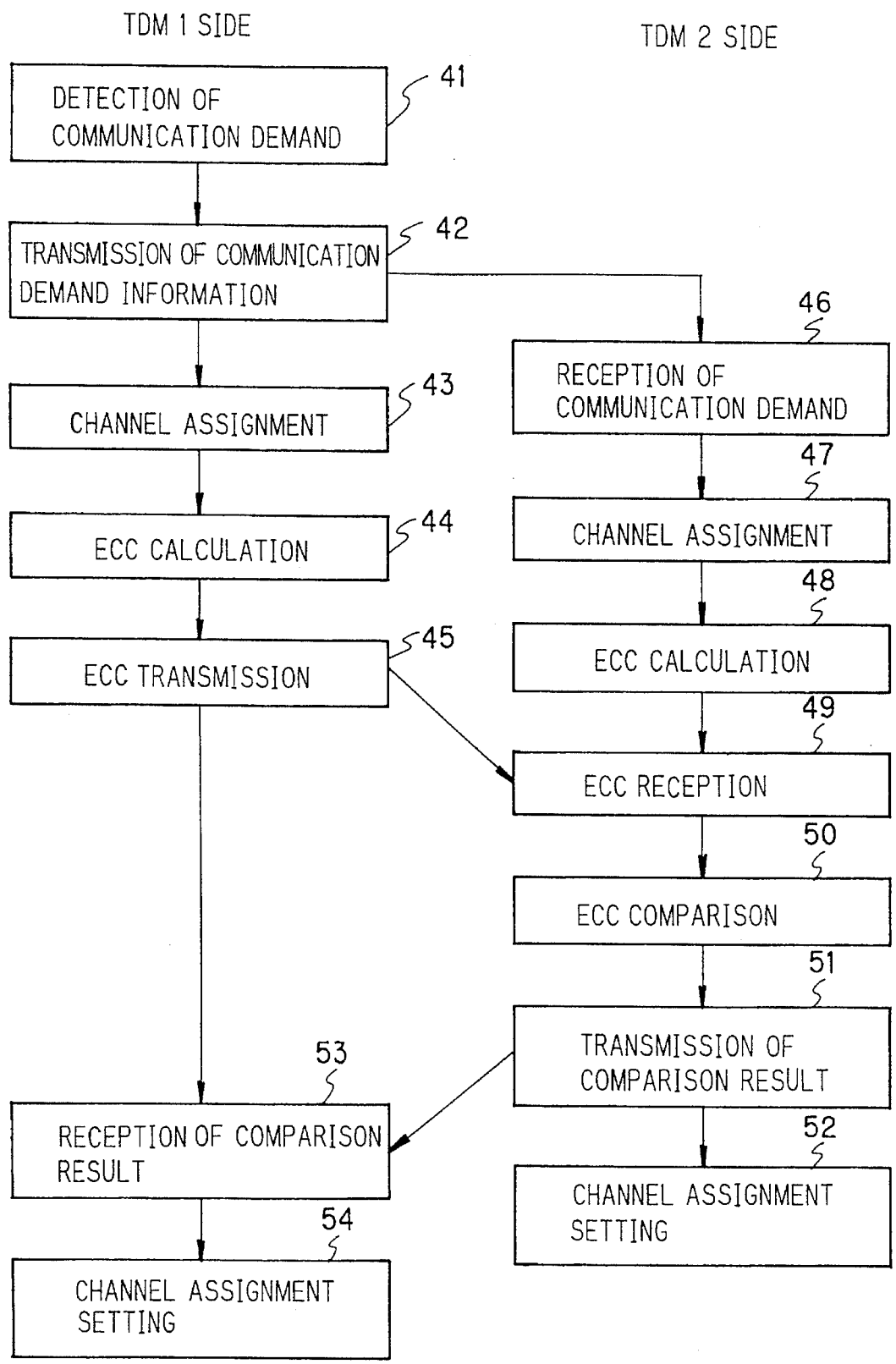
FIG. 4 shows a flow chart of an operation of the embodiment of the present invention.

The operation of the embodiment of the present invention will now be described in detail with reference to the flow chart of FIG. 4. Any communication demand from any terminal covered by the TDM 1 is detected by the communication demand detector 13 via the terminal communication controller 12 (step 41). The detected communication demand is transmitted from the TDM communication controller 11 to the TDM 2 as the opposite station via the control channel (step 42).

At the same time, the channel assignment controller 14 makes assignment of vacant channel in the channel assignment table 17 with reference to the attribute table 16 (step 43). The ECC controller 15 calculates the ECC of the channel assignment information (step 44). The calculated ECC is transmitted through the TDM communication controller 11 to the TDM 2 (step 45).

As the ECC in the ECC controllers 15 and 25 may be used ECC based on well-known error detection/correction technique. Examples of the ECC code are vertical parity code, horizontal parity code, group count check code, Humming code, CRC (Cyclic Redundancy Check) code, etc. Among these code examples, the CRC code is most extensively used. Merits of this code are that the code length is variable and that the error correction function of the code is most powerful. It is thus preferable to use the CRC code.

When the TDM 2 receives the communication demand (step 46), like the operation on the side of the TDM 1, the channel assignment controller 24 assigns a vacant channel in the channel assignment table 27 with reference to the attribute table 26 (step 47), and the ECC controller 25 calculates the ECC of the channel assignment information (step 48).

When the TDM communication controller 21 receives the channel assignment information ECC from the TDM 1 (step 49), it delivers the ECC to the ECC controller 25. The ECC controller 25 thus compares own generated ECC and the received ECC (step 50).

The result of comparison is sent out to the TDM 1 via the control channel (step 51). It is when and only when the result shows coincident, (that is, when the two compared ECCs are the same), that channel assignment setting (i.e, updating of channel by using a vacant channel) is made in the channel assignment table 27 (step 52). Likewise, on the side of the TDM 1, if the result of the ECC comparison shows the coincident, channel assignment setting is made by the channel assignment controller 14 (step 54). If the result of comparison shows no coincident, no channel assignment setting is made.

As has been described in the foregoing, according to the present invention, in lieu of the transmission and reception of channel assignment information with respect to the communication demand to and from the opposite TDM, the sole ECC of the channel assignment information is transmitted and received via the control channel, and the sole results of ECC comparison mutually transmitted and received via the control channel. Thus, even in case of low control channel transmission speed, the amount of information that is transmitted and received may be small. The transmission time thus can be reduced to reduce time until the channel assignment setting in response to the generation of a communication demand. It is thus possible to obtain more efficient and smoother communication.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. A demand assigned communication control system comprising a first and a second communication controllers connected to each other via a communication line, and each covering a plurality of terminals and assigning vacant channel in response to a communication demand for communication of the terminals, wherein:

the first communication controller includes means for setting in advance attribute information necessary for communication of each of the plurality of terminals, means for making the channel assignment according to the attribute information, means for generating ECC of the channel assignment information, and means for transmitting the ECC to the second communication controller; and the second communication controller includes means for setting in advance attribute information necessary for communication of each of the plurality of terminals, means for making the channel assignment according to the attribute information, means for generating ECC of the channel assignment information, and means for comparing own ECC and the received ECC of the first communication controller and transmitting the comparison result to the first communication controller.

2. The demand assigned communication control system as set forth in claim 1, wherein the ECC and the comparison result are transmitted via a control channel.

3. The demand assigned communication control system according to claims 1, wherein the first and second communication controllers have respective channel assignment tables for managing the current channel assignment, the channel assignment tables being used to make the channel assignment.

4. The demand assigned communication control system according to claims 2, wherein the first and second communication controllers have respective channel assignment tables for managing the current channel assignment, the channel assignment tables being used to make the channel assignment.

5. A demand assigned communication control system comprising steps of:

transmitting from one of central communication controllers each covering at least one terminal, in response to receipt of a communication demand from the terminal, the demand to an opposite central communication controller, and making a channel assignment;

generating ECC of the channel assignment information and transmitting the ECC to the opposite central communication by the one central communication controller;

receiving the ECC, comparing the received ECC with ECC of the channel assignment information generated in the opposite central communication controller, and transmitting the comparison result to the one central communication controller; and setting the channel assignment setting in both the central communication controllers if the comparison result shows the coincident.

6. A demand assigned communication control system as set forth in claim 5, wherein the ECC is vertical parity code, horizontal parity code, group count check code, or Humming code, CRC (Cyclic Redundancy Check) code.

7. A demand assigned communication control system having two TDMs (time division multiplex systems) each serving as central communication controllers, covering a plurality of terminals, connected to each other via a communication line, and comprising:

a terminal communication controller serving as an interface for communication with the terminals;

a TDM communication controller serving as an interface for communication with an opposite TDM in the opposite station;

a communication demand detector for detecting a communication demand from any of the terminals;

a channel assignment controller for making a channel assignment with respect to the communication demand if the communication demand detector detects the communication demand;

an ECC controller for generating and comparing ECC of the channel assignment information transmitted from the opposite TDM and its own ECC, and reports the comparison result to the channel assignment controller and to the opposite TDM;

wherein the opposite TDM receives the communication demand from the terminal and transmits this received demand to the opposite TDM, and if the result of the ECC comparison shows the coincident, the channel assignment controller makes the channel assignment setting.

8. A demand assigned communication control system as set forth in claim 7, wherein the channel assignment is made based on the number of time slots necessary for the communication of the terminals and multiplexing rules.

9. A demand assigned communication control system as set forth in claim 7, wherein the ECC is vertical parity code, horizontal parity code, group count check code, or Humming code, CRC (Cyclic Redundancy Check) code.

10. A demand assigned communication control system comprising steps of:

detecting any communication demand from any terminal covered by one TDM (time division multiplex systems) and transmitting the detected communication demand from the one TDM to an other TDM as the opposite station via the control channel;

making channel assignment of vacant channel in the one TDM;

calculating ECC of the channel assignment information and transmitting the calculated ECC through the TDM communication controller to the other TDM;

making channel assignment of a vacant channel and calculating ECC of a channel assignment information in the other TDM;

comparing own generated ECC and the received ECC, in response to receipt of the channel assignment information ECC from the one TDM in the other TDM; and making the channel assignment when the comparison result shows coincident in either of the TDM.

11. A demand assigned communication control system as set forth in claim 10, wherein the channel assignment is made based on the number of time slots necessary for the communication of the terminals and multiplexing rules.

12. A demand assigned communication control system as set forth in claim 10, wherein the ECC is vertical parity code, horizontal parity code, group count check code, or Humming code, CRC (Cyclic Redundancy Check) code.

* * * * *